US012045790B2

(12) United States Patent
Masucci

(10) Patent No.: US 12,045,790 B2
(45) Date of Patent: Jul. 23, 2024

(54) SYSTEM FOR CREATING AND TRANSFERRING CRYPTO-TOKENS IN EXCHANGE FOR COMMODITIES

(71) Applicant: Bryan Masucci, San Diego, CA (US)

(72) Inventor: Bryan Masucci, San Diego, CA (US)

(*) Notice: Subject to any disclaimer, the term of this patent is extended or adjusted under 35 U.S.C. 154(b) by 0 days.

(21) Appl. No.: 18/078,905

(22) Filed: Dec. 9, 2022

(65) Prior Publication Data
US 2024/0193565 A1 Jun. 13, 2024

(51) Int. Cl.
G06Q 20/00 (2012.01)
G06Q 20/06 (2012.01)
G06Q 20/12 (2012.01)

(52) U.S. Cl.
CPC ......... G06Q 20/123 (2013.01); G06Q 20/065 (2013.01)

(58) Field of Classification Search
CPC .................................................. G06Q 20/123
See application file for complete search history.

(56) References Cited

U.S. PATENT DOCUMENTS

| | | | |
|---|---|---|---|
| 10,776,781 B2 | 9/2020 | Mayblum et al. | |
| 10,929,842 B1 | 2/2021 | Arvanaghi et al. | |
| 11,308,487 B1* | 4/2022 | Foster | G06Q 20/3829 |
| 11,909,860 B1* | 2/2024 | So | G06Q 40/06 |
| 11,922,405 B2* | 3/2024 | Hilton | G06Q 20/027 |
| 2018/0268382 A1 | 9/2018 | Wasserman | |
| 2020/0042996 A1* | 2/2020 | Mayblum | G06Q 20/10 |
| 2020/0311816 A1* | 10/2020 | Calvin | H04L 9/50 |
| 2020/0380476 A1 | 12/2020 | Trudeau et al. | |
| 2022/0261882 A1* | 8/2022 | Youb | G06Q 30/02 |
| 2022/0337424 A1* | 10/2022 | Fournier | H04L 9/3236 |
| 2023/0058531 A1* | 2/2023 | Mayblum | H04L 9/50 |
| 2023/0075884 A1* | 3/2023 | Jakobsson | H04L 9/50 |

OTHER PUBLICATIONS

Financial Instruments Generation via Tokenization into Commodity (Year: 2020).*
Historical Context and Key Features of Digital Money Tokens (Year: 2020).*
"Financial Instruments Generation via Tokenization into Commodity", IEEE (Year: 2020).*
"A Descriptive Analysis of US Initial Coin Offerings" IEEE (Year: 2020).*

* cited by examiner

Primary Examiner — Bruce I Ebersman
(74) Attorney, Agent, or Firm — Weitzman Law Offices, LLC

(57) ABSTRACT

A system and method for creating cryptographically secure tokens and using them to allocate commodities are disclosed. Various servers in communication with one another cause a system to receive a quantity of the commodity or a representation of the quantity of the commodity from one or more autonomous agent computing devices; create one token for each unit in the quantity of the commodity; track the use of created tokens and determine a likelihood that each created token will be exchanged for a unit of the commodity in a particular future time window; ensure that, with a predetermined confidence level, an amount of the commodity exceeding expected exchanges in the particular future time window will be made available by the one or more backup servers; and in response to receiving a request to exchange tokens for the commodity, providing a unit of the commodity for each token exchanged.

10 Claims, 5 Drawing Sheets

SYSTEM FOR CREATING AND TRANSFERRING CRYPTO-TOKENS IN EXCHANGE FOR COMMODITIES

FIELD OF INVENTION

This disclosure relates to systems and methods for creating cryptographic tokens associated with distributed ledgers, and more specifically, to systems and methods for efficiently storing and transferring assets or commodities by creating a token in exchange for a transfer of assets or commodities and later allowing the token to be exchanged to receive an equivalent quantity of the assets or commodities.

BACKGROUND

In recent decades, blockchain based technologies have seen an explosion in adoption and branching into new applications, from cryptocurrencies, to smart contracts, to non-fungible tokens (NFTs). By replacing a single centralized ledger and authority with a decentralized distributed ledger over a network and changes to that ledger being made only by consensus among a majority of nodes in the network, the security of the ledger is improved. No single actor, or even an authority attempting to compel multiple actors, can have any effect on the ledger unless a majority of nodes can be compromised.

Although cryptocurrencies have long been used as a speculative or experimental asset by individual cryptocurrency "miners", it is only very recently that banks or investment funds have begun to normalize their use and incorporate them into traditional financial interactions. Even when this normalization might be expected to stabilize value, cryptocurrencies have experienced significant volatility in value and made them disfavored for low-risk investment portfolios. "Stablecoins" are cryptocurrencies that are pegged to an existing fiat currency and are meant to always be exchanged for the same nominal value, rather than having a potential gain or loss in value.

Similar to stablecoins, some forms of tokens are pegged to a particular commodity, such as the petromoneda that is associated with a barrel of oil, or the Digix gold token associated with a gram of gold. Tokens may theoretically be created, backed by any physical commodity (oil, gold, wheat, water, etc.) or more abstract commodity (currency, electricity, computation time, etc.).

Whether a distributed ledger token system represents currency, oil, electricity, gold, or any other physical or abstract commodity, care must always be taken that the token-creating authority maintains sufficient reserves and liquidity to guarantee exchange of all tokens for the promised nominal value, and prevent a situation analogous to a "bank run" from depleting the system's reserves. This goal must also be balanced against the actual cost or opportunity cost of simply storing the deposited assets, rather than utilizing them and maintaining only a fractional reserve expected to meet liquidity needs. For example, an oil broker wants to maintain no more tanks than necessary to meet expected demand, an electricity broker wants to maintain no more batteries than necessary to meet expected demand, and a currency broker may have no physical constraints on currency holding, but may need to loan its holdings in order to remain profitable.

Thus, there are advantages to having a system that allows a deposit of assets or commodities, tracks those deposits using tokens in a distributed ledger, and allows exchange of tokens for the assets or commodities, while carefully estimating expected future exchanges and maintaining no more liquidity than is necessary and efficient.

SUMMARY OF THE INVENTION

In order to address the limitations of existing systems that create tokens in exchange for assets or commodities, a novel system and method are disclosed for receiving a deposit of assets or commodities, tracking those deposits using tokens in a distributed ledger/blockchain, estimating the likelihood that any given token will be exchanged, and using this information to manage liquidity and satisfy all requests to exchange tokens for the deposited asset or commodity.

A system for creating cryptographically secure tokens and using them to allocate commodities is disclosed. The system comprises at least a master account server coupled to storage for a commodity: one or more backup servers coupled to storage for the commodity; and a cryptographic token generating server. Software instructions, when executed by one or more processors of one of the servers, cause the one or more processors to perform a series of steps beginning with receiving, at the master account server, a quantity of the commodity or a representation of the quantity of the commodity from one or more autonomous agents. In response, the cryptographic token generating server creates one token for each unit in the quantity of the commodity to the one or more autonomous agents. The system tracks the use of created tokens and determine a likelihood that each created token will be exchanged for a unit of the commodity in a particular future time window and ensures that, with a predetermined confidence level, an amount of the commodity exceeding expected exchanges in the particular future time window will be made available by the one or more backup servers. Later, in response to receiving a request to exchange one or more tokens for the commodity, the system provides, through the backup servers, if necessary, a unit of the commodity for each token exchanged to the one or more autonomous agents.

Additional features include variations of the above system and method wherein
- a server stores a cryptowallet on behalf of one of the autonomous agent computing devices, and the commodity is exchanged from or through it;
- there are two or more backup servers, and wherein the two or more backup servers collectively agree to provide at least 100% of a total amount of the commodity received from all autonomous agent computing devices; and especially where the two or more backup servers each agree to individually provide a sufficient portion of the total amount of the commodity received from all autonomous agent computing devices that collective obligations of any set of backup servers that omits only one of the backup servers will be at least 100% of the total amount of the commodity received from all autonomous agent computing devices;
- determining a likelihood that each created token will be exchanged for a unit of the commodity in a particular future time window comprises determining whether the created token is still present in an account on a wallet server to which the created token was created, is being stored in a geographic region that will delay exchange of the created token, has been transferred to another account that will delay exchange of the created token, and/or has been incorporated into a smart contract; and/or
- a token for a first commodity is converted into a token for a second, related commodity, and wherein the token for the second, related commodity is exchanged by a same autonomous agent computing device that deposited the first commodity, and the token for the first commodity is exchanged by a different autonomous agent computing device.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
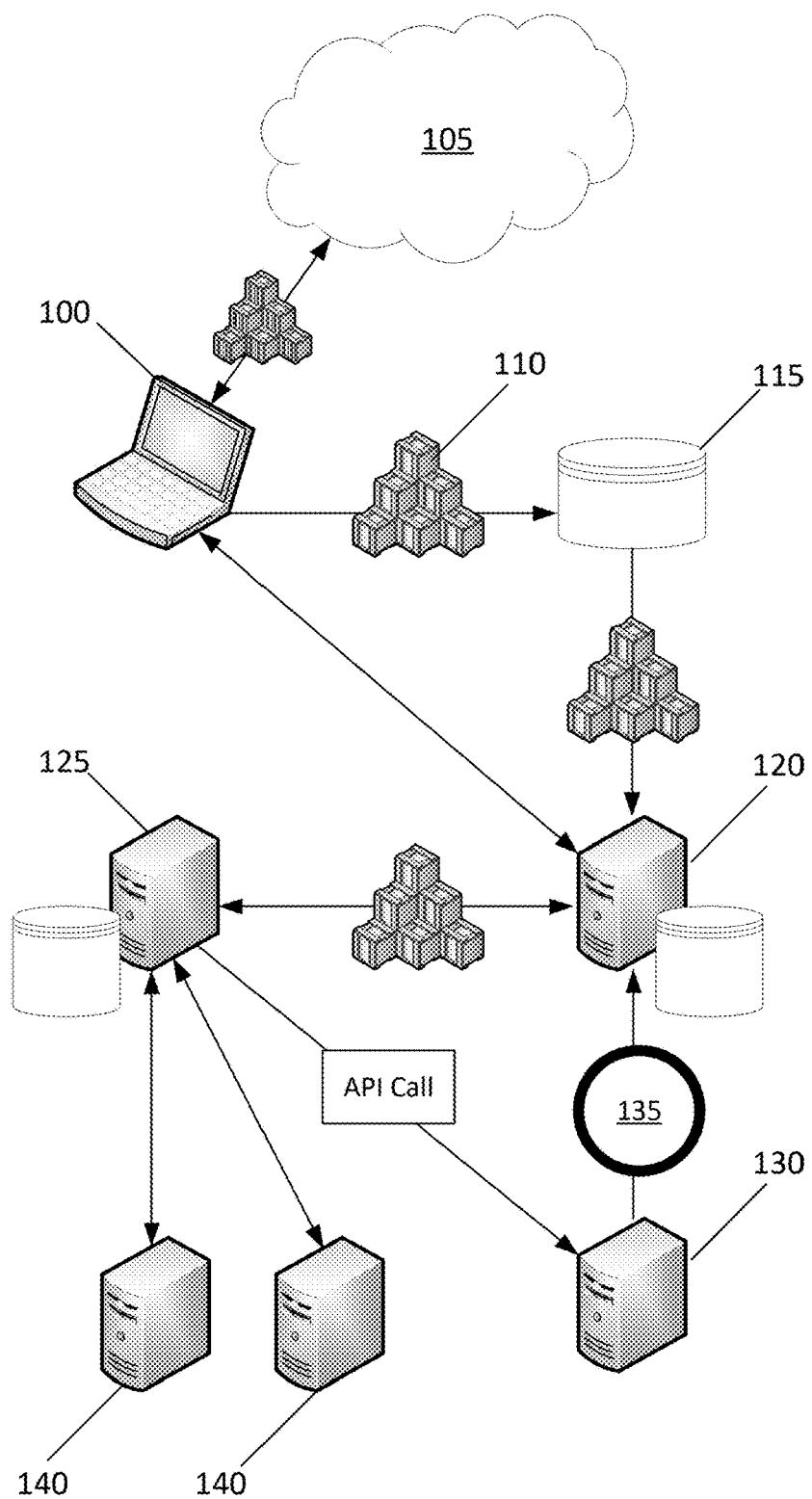
FIG. 1 illustrates, in simplified form, a system for receiving a commodity and creating a token in response.

FIG. 1 illustrates, in simplified form, a system for receiving a commodity and creating a token in response.

Discussing now a general form that describes a number of different specific embodiments, a number of autonomous agent computing devices 100 interact with each other within an environment 105. As part of these interactions, a commodity 110 may be obtained, mined, used, traded, exhausted, promised, or otherwise transferred among the autonomous agent computing devices or between them and the environment. For example, the environment 105 may be a physical location where physical devices or human individuals require or consume a commodity 110 such as electricity, water, or oil: alternatively, the environment 105 may be a network over which data is exchanged, a market over which currencies or assets are exchanged, or another more generic structure for transfer of commodities.

The autonomous agent computing devices 100 may be, in some embodiments, computing devices that take actions within the environment 105 without direct human input, such as an autonomous vehicle, a smart home, a drone aircraft, a submersible, a satellite, a lander on a planetary surface, a network connected computing device making decisions and transmitting information to other devices on a network based on an artificial intelligence, or any other form of robotic or automated device. In other embodiments, the autonomous agent computing devices 100 may act as a means for an individual human or an organization to interface with a data-transmission network, and may be desktop or laptop computers, mobile phones, gaming consoles, smart watches or other wearable computing devices, or any other computing device used by a human user to communicate with other computing devices, especially using a web browser to access an API in a web-based application.

An agent storage 115 is used to store an amount of a commodity 110 on behalf of an autonomous agent computing device 100 or on behalf of an operator of that device. For example, the agent storage 115 might be a physical tank for a fluid or a battery or capacitor for electric energy, connected to other elements of the system by a pipe or conduit. Agent storage 115 might instead be connected to other elements of the system electronically, and be, for example, a repository of data or a bank that is capable of making digital transfers of currency.

A "wallet" server 120 may be used to store in the short term an amount of a commodity 110 transferred from the agent storage 115 and on a longer term, a number of tokens 135 that will be generated to represent the commodity and that can be exchanged back for the commodity at a future time.

A master account server 125 has storage to collect deposits of the commodity 110 by a large number of autonomous agent computing devices 100. For each instance of an autonomous agent computing device 100 depositing an amount of the commodity through the wallet server 120, an API call to a token generating server 130 will occur, and the token generating server 130 will generate one or more tokens 135 to represent units of the commodity. For example, the token generating server 130 might generate one token for every barrel of oil, every megawatt of electricity, every gallon of water, or every dollar of a deposit made. As previously described, a variety of methods are known in the art for generating "stablecoins" or commodity backed crypto-coins (such as the petromoneda or the Digix gold token) that can add a token to a distributed ledger without having to "mine" the coin in the same way a Bitcoin or most other cryptocurrencies are generated.

The generated token(s) 135 are stored at the wallet server 120, and the autonomous agent computing device is given control over potential further manipulation of the tokens. For example, the tokens might be transferred to the ownership of another autonomous agent, or might be tied to a smart contract that will execute at a moment in the future. The wallet server may optionally incentivize the autonomous agent to retain the tokens at the wallet server and not transfer or encumber them in any way, by offering interest on the tokens, in the form of additional tokens, or transfers of value in a different format.

The master account server 125 is, in a preferred embodiment, in communication with multiple backup servers 140, each backup server having their own storage for the commodity 110. If necessary, the master account server 125 can obtain a quantity of the commodity from one or more of the backup servers 140 if the master account server 125 receives a request to exchange a token 135 for the commodity 110, and does not have sufficient reserves of the commodity at hand. More details on this aspect of the disclosure may be found in relation to FIG. 2, discussed below.

Although a particular division of functions between devices is implied with relation to the systems depicted in FIG. 1, above, other configurations are possible in which functions are divided among devices differently. For example, the functions of some or all of the wallet server 110, the master account server 125, the token generating server 130, and/or the backup servers 140 may be performed by a single, standalone device with multiple threads executing different software modules simultaneously. Similarly, the agent storage 115 might be incorporated into a same device as the autonomous agent computing device 100 itself.

Alternatively, each system or device from among wallet server 110, the master account server 125, the token generating server 130, and/or the backup servers 140 may, instead of being a single device, be a cluster of computing devices sharing functionality for concurrent processing. Further, rather than being a single device or even a single cluster, a cloud-based solution—with multiple access points to widely geographically distributed similar systems that synchronize their data and are all available as backups to one another—may be preferable in some embodiments to a unique set of computing devices all stored at one location. The specific number of computing devices and whether communication between them is performed via network transmission between separate computing devices or accessing a local memory of a single computing device is not so important as the functionality that each part has in the overall scheme. What does remain of importance is that each of the autonomous agent computing devices 100, backup servers 140, and master account server 125 be able to receive deposits and satisfy withdrawals of a commodity into or through the environment 105.

Figure 2:
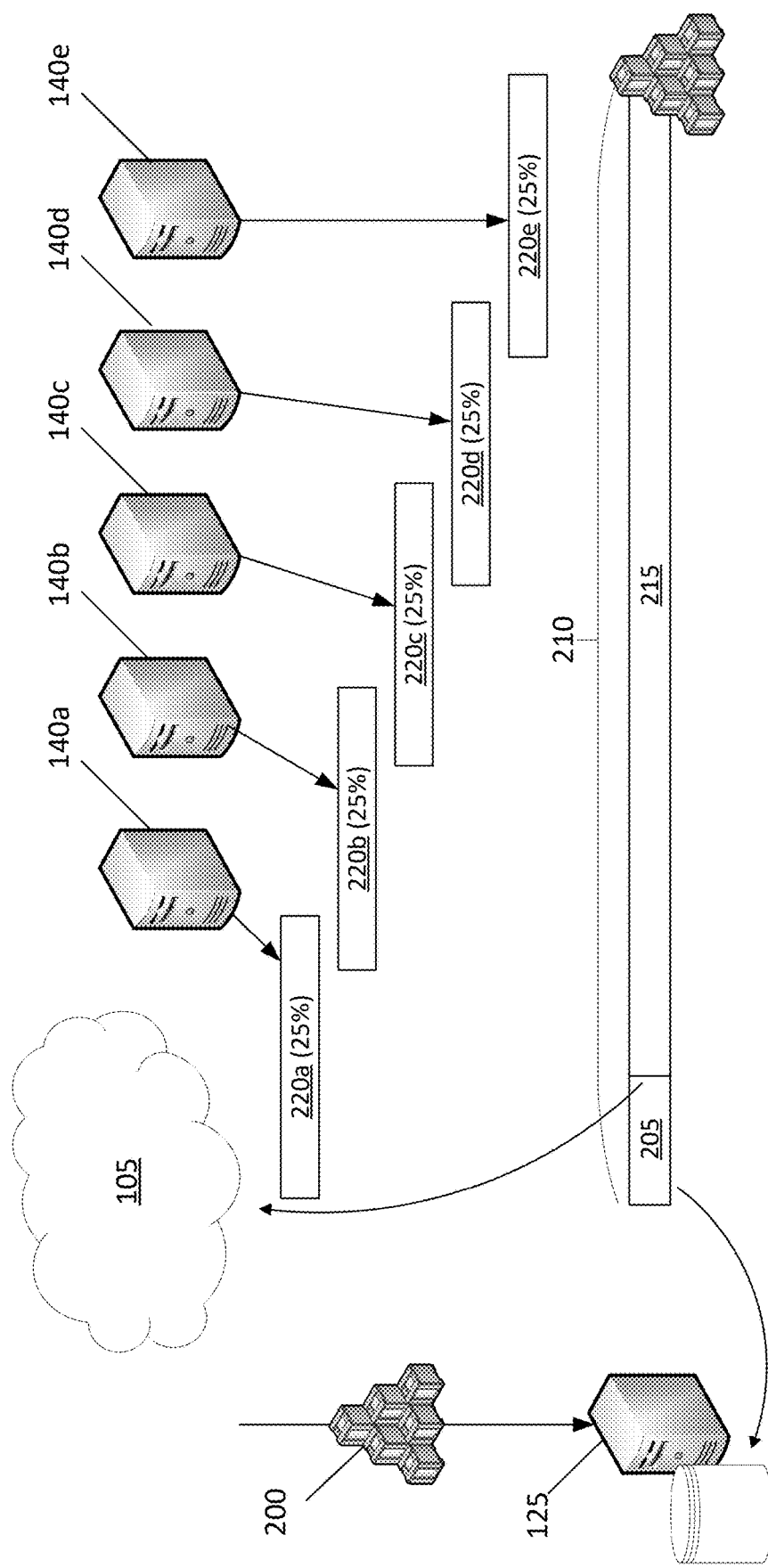
FIG. 2 depicts, in simplified form, another aspect of the system focused on interactions between the master account server and the backup servers from FIG. 1.

FIG. 2 depicts, in simplified form, another aspect of the system focused on interactions between the master account server and the backup servers from FIG. 1.

As previously mentioned, the master account server 125 may incur actual costs or opportunity costs if the commodity deposits from the autonomous agent computing devices 100 are simply stored until exchange of the created token(s). Rather than maintain sufficient storage locally to satisfy all possible future exchanges, it is preferable to efficiently use most of the commodity 200 within the environment 105, and maintain minimal reserves 205 locally. The master account server 125 can rely on the backup servers 140 to supply the commodity if in the short term, requests for exchanges exceed the size or magnitude of the local reserves. In a preferred embodiment, the local reserves 205 represent about 10% of the original deposits 210, and a remainder 215, representing 90% of the deposit 210, being used in the environment 105 or otherwise transferred way from the master account server 125. In other embodiments, other ratios between the local reserves 205 and remainder 215 may be selected based on the difficulty of moving or transferring the commodity, the desired level of reliance on backup servers, the difficulty of predicting future exchange requests (see FIG. 4, below), the inefficiencies or costs associated with static storage of the commodity, opportunities that can be realized by transferring the commodity into the environment 105, or other factors.

In a preferred embodiment, the backup servers 140 are selected and agree to obligations such that each backup server 140a, 140b, etc. is obligated to supply a portion 220a, 220b, etc. equivalent to a portion of the total deposits, if necessary. The obligation may be contingent on the master account server 125 depleting its reserves, with the backup server only making up for a shortfall: alternatively, the obligation may include the backup server agreeing to allow direct exchange of one or more created tokens, without an autonomous agent computing device 100 having to communicate with or notify the master account server 125 at all. In the latter case, to facilitate a direct exchange, the backup servers 140 may operate equivalent software/APIs to the wallet server 110 to allow an autonomous agent computing device to transfer one or more tokens to the backup server, to be verified as legitimate tokens created by the system, and to authorize release or transfer of units of the commodity to the requesting autonomous agent computing device 100.

The sizes or magnitudes of the portions 220 are preferably selected such that they sum to more than 100% of the total deposits 210, and even more specifically, that any set of portions, absent one, still sum to at least 100%. For example, five backup servers might be responsible for a 25% portion of the total deposits 210 each; if any one of the five backup servers fails to satisfy its obligation, the other four can still satisfy the full 100%.

In this way, the autonomous agent computing devices 100 can be incentivized to deposit commodities with the assurance that even if one backup server is temporarily unavailable, or becomes permanently unavailable, all tokens will likely still be exchangeable without delay.

In some embodiments, the total of the portions 220 may not need to sum to at least 100%; for example, if the local reserves 205 represent 10% of the total deposits 210, the backup servers may only need to guarantee a total amount equivalent to 90% of the total deposits to ensure that between the master account server 125 and the backup servers 140, all created tokens are exchangeable for the commodity.

In some embodiments, the portions 220 guaranteed by each backup server may be equal, while in others, some backup servers may agree to be responsible for a greater portion than others. For example, three backup servers might agree to responsibilities for 67%, 33%, and 33%, respectively. A backup server may agree to this greater responsibility in exchange for receiving a portion of the remainder 215, a greater portion of the remainder than other backup servers, for a benefit from the use of the remainder in the environment (for example, if the commodity is electricity, receiving a portion of a secondary commodity that was mined, produced, or purified using the electricity), or for any other benefit. Structuring the backup server obligations in this way may lead to greater overall coverage (133% in this example, compared to 125% in a previous example), but may also introduce greater fragility if a larger backup server becomes unavailable. Different structures may be permitted or preferable based on the particular needs of a use case, including the external consequences of an exchange failure (for example, is an agent a financial account holder who is merely unable to access currency for a short period of time, or a factory that must completely shut down operations because it no longer has access to electricity?), legal requirements for operation in the environment, or other considerations.

After the various servers in communication with the master account server 125 and the backup server obligations have been established, tokens may be routinely created, tracked, and exchanged. A flowchart describing these interactions is depicted in FIG. 3 and described in greater detail below.

Figure 3:
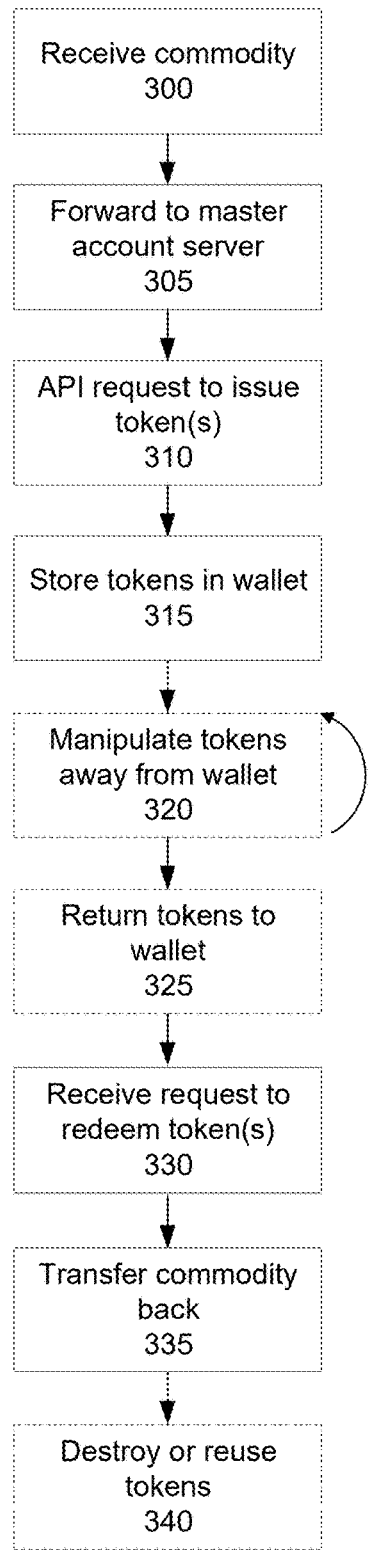
FIG. 3 depicts, in simplified form, a method for creating tokens in response to commodity deposits and for exchanging the tokens at a future time.

FIG. 3 depicts, in simplified form, a method for creating tokens in response to commodity deposits and for exchanging the tokens at a future time.

First, the wallet server 120 receives a commodity 110 from the agent storage 115 (Step 300). The wallet server 120 then forwards the commodity 110 to the master account server 125 for either long-term storage or immediate use (Step 305).

The master account server 125 counts or measures the amount of the commodity received and sends an API request to the token generating server 130 to create an appropriate number of corresponding tokens 135 (Step 310). The tokens are stored at the wallet server 120 (Step 315).

The autonomous agent computing device 100, either of its own volition or enacting the intent of a human user, can then use the wallet server 120 to manipulate the tokens 135 (optional Step 320). The tokens may be given away, traded, sold, transferred, converted into another token, attached to a smart contract, moved to another account or wallet, or otherwise made unavailable to the wallet server 120. Alternatively, the tokens 135 may never be moved, and may remain at the wallet server (directly, ultimately to Step 330).

If the tokens 135 are moved out from the wallet server 120, they are ultimately returned to the wallet server (Step 325)—in a preferred embodiment, exchange of the token may only occur at that device, and the token remains ultimately unusable until it is returned to the wallet server. In other embodiments, the backup servers 140 or other designated computing devices may also allow exchange of tokens for the underlying commodity, and this step may involve providing the token(s) to them instead of returning to the wallet server 120.

In response to the autonomous agent computing device transmitting a request to the wallet server 120 to exchange tokens stored there (Step 330), the wallet server transmits notification of the same to the master account server 125. The master account server 125 accordingly satisfies the exchange request by transferring the appropriate amount of the commodity back through the wallet server 120 and to the agent storage 115 (Step 335).

Now that the token is no longer tied to a deposited quantity of the commodity, the token may be destroyed, deleted, marked as closed, or marked as available for re-use with a future deposit by the system (Step 340).

One can surmise from the overall scheme described by FIGS. 1 and 3, and particularly the guarantee system illustrated in FIG. 2, the system's value is greatly reduced if autonomous agents do not trust that a token can always be exchanged for the commodity. Autonomous agents will not make deposits if it is suspected that a token will become worthless due to a lack of liquidity in the system, and will deplete existing deposits if they feat a "run" on the reserves is occurring and the reserves will prove insufficient.

Figure 4:
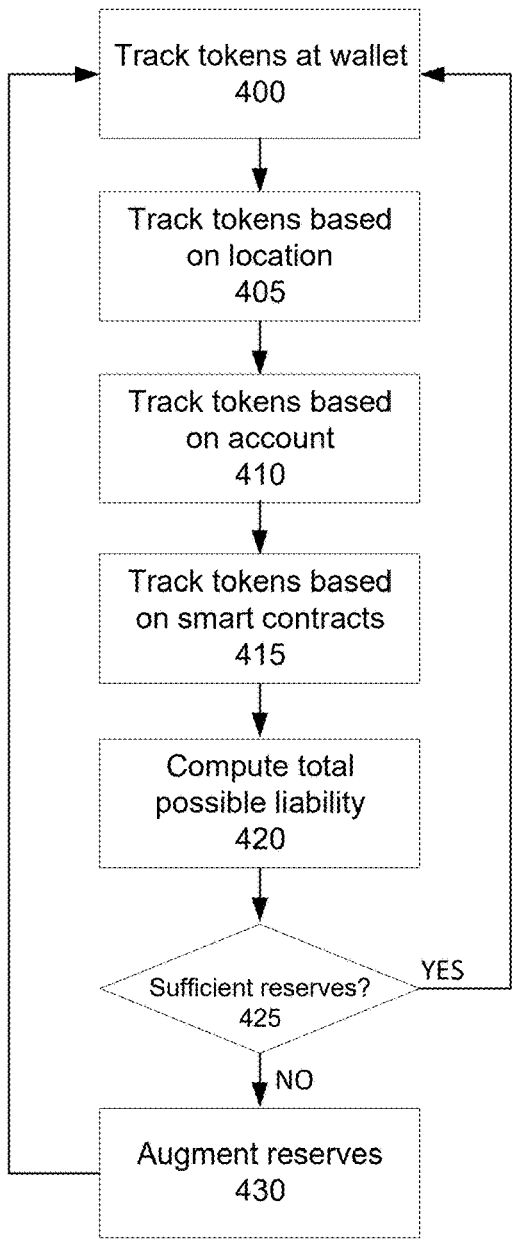
FIG. 4 depicts, in simplified form, a method for determining a likelihood that a particular token will be exchanged within a particular expected future time window, and for determining an expected total possible liability for that time window.

To help avoid that outcome, FIG. 4 depicts, in simplified form, a method for determining a likelihood that a particular token will be exchanged within a particular expected future time window, and for determining an expected total possible liability for that time window.

First, because the wallet server 120 is likely to promise the autonomous agent the ability to exchange a token at any time, tokens that are still in that account should all be considered a possible liability for any time window (Step 400). If there are restrictions on exchange, such as a time-delay between reception of the request and its guaranteed fulfilment, the total possible liability for a time window may be adjusted accordingly. In some instances, assumptions about autonomous agent behavior may mean a less conservative estimate on liability, such as assuming that even in a worst case, only half, or one quarter, or some other fraction of the exchangeable tokens would ever be exchanged during a single day or similar time window. In variants of the system where tokens may be exchanged in ways other than through the wallet server 120, tokens that are similarly available, such as tokens that have been transferred over to be held by a backup server 140, may be considered of equivalent liability to those at the wallet server 120.

Next, tokens that are no longer at the wallet server 120 may be evaluated based on geographic location (Step 405). For example, if the tokens have been transferred to a server in a foreign nation, it may be evaluated whether that nation has sanctions or reporting requirements that may delay transfer of the token back into the nation where the wallet server 120 operates. If the time window being considered is likely beyond the delay involved in repatriating the tokens, the tokens may be designated as not part of the current total liability.

Next, tokens that are no longer at the wallet server 120 may also be evaluated based on what form of account or wallet does hold them at a present moment in time (Step 410). Various legal, regulatory, or other requirements may require that transfers from a particular individual or of a particular size be reported, or that identification accompany transfers for "Know Your Customer" regulations, and so on. If the time window being considered is likely beyond the delay involved in reporting, evaluation, or other compliance issues, the tokens may be designated as not part of the current total liability.

Finally, tokens that are no longer at the wallet server 120 may also be evaluated based on whether they have been tied to a smart contract, placed in escrow, or otherwise made deliberately unavailable by the autonomous agent who owns them (Step 415). If the terms of the smart contract or the escrow are known, the system may attempt to evaluate the likelihood that the smart contract will execute during the time window or that the cause for the escrow will be resolved. If that likelihood is sufficiently small, the tokens may be designated as not part of the current total liability.

After all of these evaluation steps to include or exclude each token from concern, possibly weighted by assumptions regarding the likelihood of a token being exchanged or historical data on exchanges, a total possible liability can be computed for a given confidence threshold (Step 420). For example, the system may determine that there is a 10% chance that 10,000 tokens will be exchanged on a given day, a 1% chance that 100,000 tokens will be exchanged on that day, and a 0.1% chance that 1,000,000 or more tokens will be exchanged. This probabilistic determination can allow for different risk tolerances for different systems, for example determining that there is a 99.9% chance that exchanges over the following 24 hours will be less than the local reserves and determining that that level of certainty is sufficient, but that a 99% chance would risk failure of the system too often.

Next, the master account server 125 must determine whether the locally stored reserves are sufficient to meet the computed total possible liability (Step 425). If the reserves are sufficient, no action needs to be taken at the present moment, but re-evaluation must periodically occur to maintain proper reserve levels (back to Step 400). If the reserves are insufficient, the master account server 125 may take action (Step 430) to ensure sufficient local reserves, such as requesting from the backup servers 140 a temporary transfer of the commodity, or adjusting the ratio of local reserves 205 to the remainder 215 for future deposits in order to increase the local reserves.

Particular Use Cases

The general model described above can be adapted to numerous different types of useful applications, so long as a token can be created in response to receiving a fungible physical asset or commodity or an abstract one, and that the token can later be exchanged for another instance or the same instance of the deposited asset or commodity. Moreover, it must be stressed that although use cases described herein can be adopted for use in human interactions and financial transactions, this disclosure is in no way limited to such uses (just as the distributed ledger technology that underlies Bitcoin or other cryptocurrencies and makes them possible is not limited solely to financial transactions and can be used in completely technical and automated systems).

Electricity: A number of physical structures 100 that both generate and use electricity, such as an automated factory or a smart home with solar panels, may have times when their generation outpaces their consumption, and other times when the reverse is true. Rather than maintain batteries on-site that will not be used until a blackout occurs, the structures 100 can add their excess electricity into the electrical grid and be created tokens that represent units of power. If a blackout or brownout occurs and limited power resources are available, owners of tokens may be able to exchange them to be prioritized and be reconnected to power sooner, receive batteries of equal stored energy to the token's value. Even without a power availability disruption, tokens may be exchanged to receive a guaranty of power supply without having to pay for electricity from a supplier.

Oil and Gas: A number of autonomous vehicles or drilling structures 100 may obtain oil from the ground but not have processing or storage capacity for it at a given moment in time. By allowing another entity to take the excess oil and create tokens, the autonomous vehicle or its operator can be guaranteed that oil will be available at a future time without needing to maintain additional storage in that time. Tokens representing oil may also be exchangeable in a predetermined ratio for tokens representing gasoline or other petroleum products, such that a depositor who does not have oil refining capabilities can still efficiently make use, indirectly, of the oil it has drilled or obtained.

Water: A number of public reservoirs 100 may at times have excess water compared to their capacity, and prefer to share the excess water with a nearby, drier region. By creating tokens in response to a deposit of water in the present, reservoirs may be able to exchange the tokens during a time of local drought to replenish the reserves, or sell or transfer the tokens to local smart home or industrial plants, such that those buildings will be prioritized for water access by exchanging the tokens.

Other Physical Commodities: This system and method can be applied to any other physical commodity, including wheat, soybeans, and other foods/crops, wood or other natural harvests, metals, ores, and other mineral resources, and so on. Tokens may also, similar to the oil and gas example described above, be created for a first commodity, converted to tokens of a second commodity, and exchanged, such as by depositing an ore and ultimately exchanging a token to receive a refined metal.

Computation Time: It is common for all sorts of computing devices 100 to have idle CPU time that could be used for various public service projects (such as the medical theory project Folding at Home) or profitably (such as for cryptocurrency mining). An idle computing device may offer to run arbitrary software commands locally for a certain period of time or for a certain number of trillions of instructions, and be created tokens representing an amount of computing time or computations performed. The tokens may then be exchanged in the future when the original computing device—or another computing device to which the tokens have been transferred—needs to perform a computationally expensive process that can be divided among multiple computing devices. The backup servers 140 operate computing devices that will participate in the computation upon request and exchange of the tokens, greatly speeding the calculations when they are urgently needed in exchange for the idle CPU time from the past.

Carbon offsets and other common goods: In countries that operate a carbon permitting scheme, smart homes or factories 100 may be able to earn tokens and exchange them with one another by under-emitting $CO_2$ at a first moment in time and later exchanging the tokens to avoid a fee for over-emitting at a later moment in time. The same principle may apply to other regulated "common goods"; for example, if an organization has an exclusive permit to fish in particular waters, an organization not in a position to capitalize on the use of the permit may agree to transfer the permit to another organization during a first time period, receive a token for an equivalent period of time, and exchange in the future to receive another organization's equivalent rights to fish.

Fiat Currencies: The system and method described here can apply to conversion of fiat currencies into stablecoins, using the stablecoins in a marketplace or in interest-bearing investment accounts, and exchanging the stablecoins at a future moment in time. Backup servers agree to insure the master account server and provide an analogue to FDIC insurance for stablecoin-backed accounts, in exchange for fees or for the right to use of a portion of the deposits that are not local reserves for their own short-term investments. The created stablecoins may be traded for other cryptocurrencies or assets, or incorporated into smart contracts. Investors are incentivized to participate by the offer of interest on stablecoins that remain in the wallet server's accounts, as well as knowing that the backup servers have guaranteed over 100% collateralization of the deposits, so the accounts are virtually as safe as any bank's, while having the additional features of blockchain applications available.

General Computing Devices

Although FIGS. 1 and 2 depict a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
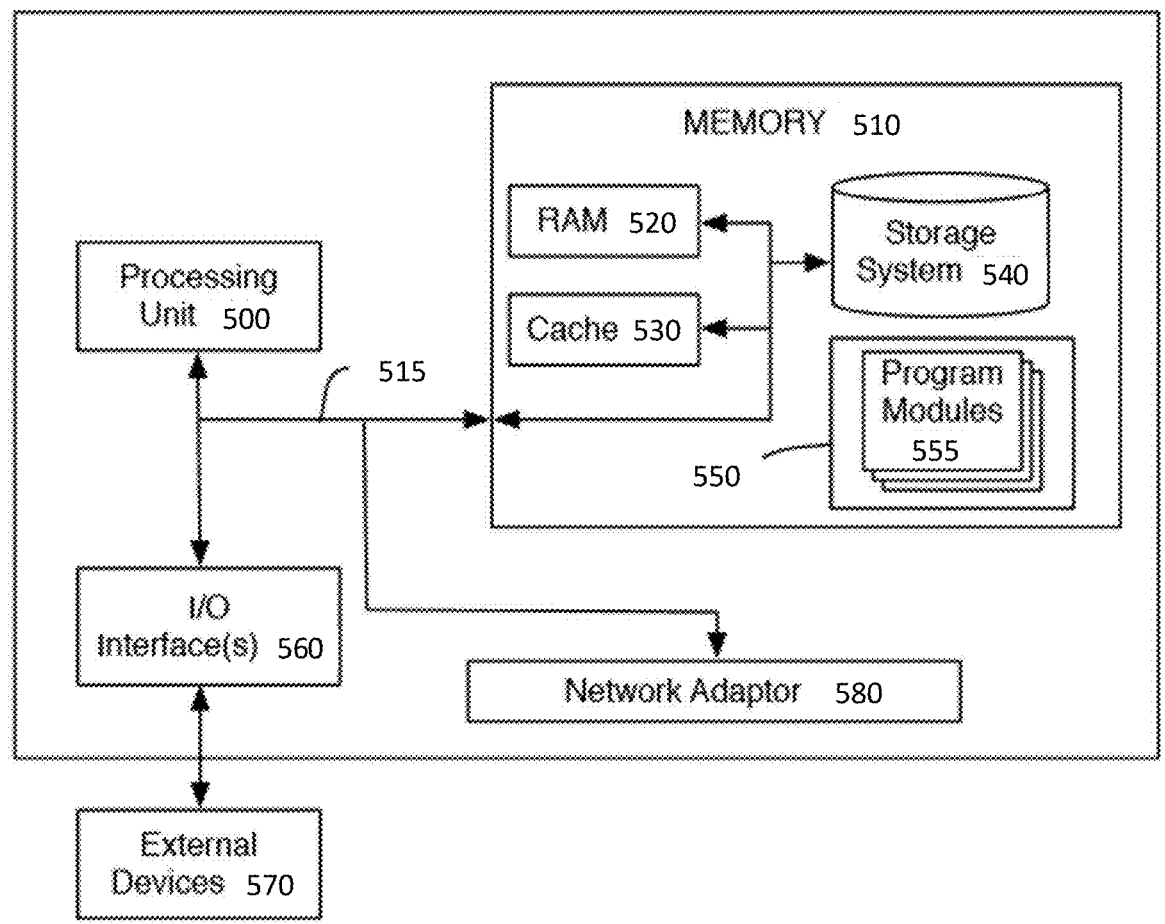
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of an autonomous agent computing device 100, the wallet server 110, the master account server 125, the token generating server 130, a backup server 140, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.: one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for creating standardized, value-securing cryptographically secure tokens and using them to allocate refined commodities, comprising:

a master account server coupled to storage for a refined commodity;
   two or more backup servers coupled to storage for the refined commodity;
   a cryptographic token generating server; and
   non-transitory memory storing instructions that, when executed by one or more processors of one of the servers, cause the one or more processors to:
      receive, at the master account server, a quantity of the refined commodity or a representation of the quantity of the refined commodity from one or more autonomous agent computing devices;
      create, by the cryptographic token generating server and to the one or more autonomous agent computing devices, one token for each unit in the quantity of the refined commodity;
      track the use of created tokens and calculate a likelihood that each created token will be exchanged for a unit of the refined commodity in a particular future time window at least in part by determining whether the created token is being stored in a geographic region that will delay exchange of the created token;
      ensure that, with a predetermined probability, an amount of the refined commodity exceeding expected exchanges in the particular future time window will be present at the master account server or made available by the two or more backup servers; and
      in response to receiving a request to exchange one or more tokens for the refined commodity, provide to the one or more autonomous agent computing devices a unit of the refined commodity for each token exchanged,
      wherein the two or more backup servers collectively agree to provide more than 100% of a total amount of the refined commodity received from all autonomous agent computing devices, by agreeing to individually provide a sufficient portion of the total amount of the refined commodity received from all autonomous agent computing devices such that collective obligations of any set of backup servers that omits only one of the backup servers will be at least 100% of the total amount of the refined commodity received from all autonomous agent computing devices.

2. The system of claim 1, further comprising a server that stores a cryptowallet on behalf of one of the autonomous agent computing devices, and from or through which the refined commodity is exchanged.

3. The system of claim 1, wherein calculating a likelihood that each created token will be exchanged for a unit of the refined commodity in a particular future time window additionally comprises determining whether the created token is still present in an account on a wallet server to which the created token was created.

4. The system of claim 1, wherein calculating a likelihood that each created token will be exchanged for a unit of the refined commodity in a particular future time window additionally comprises determining whether the created token has been transferred to another account that will delay exchange of the created token.

5. The system of claim 1, wherein calculating a likelihood that each created token will be exchanged for a unit of the refined commodity in a particular future time window additionally comprises determining whether the created token has been incorporated into a smart contract.

6. A method of creating standardized, value-securing cryptographically secure tokens and using them to allocate refined commodities or trade of underlying value of the refined commodities for future redemption and receipt of equivalent refined commodities, comprising:
    receiving a quantity of a refined commodity or a representation of the quantity of the refined commodity from one or more autonomous agent computing devices;
    creating to the one or more autonomous agent computing devices one token for each unit in the quantity of the refined commodity;
    tracking the use of created tokens and calculating a likelihood that each created token will be exchanged for a unit of the refined commodity in a particular future time window at least in part by determining whether the created token is being stored in a geographic region that will delay exchange of the created token;
    ensuring that, with a predetermined probability, an amount of the refined commodity exceeding expected exchanges in the particular future time window will be made available by two or more backup servers; and
    in response to receiving a request to exchange one or more tokens for the refined commodity, providing to the one or more autonomous agent computing devices a unit of the refined commodity for each token exchanged,
    wherein the two or more backup servers collectively agree to provide more than 100% of a total amount of the refined commodity received from all autonomous agent computing devices, by agreeing to individually provide a sufficient portion of the total amount of the refined commodity received from all autonomous agent computing devices such that collective obligations of any set of backup servers that omits only one of the backup servers will be at least 100% of the total amount of the refined commodity received from all autonomous agent computing devices.

7. The method of claim 6, further comprising a server that stores a cryptowallet on behalf of one of the autonomous agent computing devices, and from or through which the refined commodity is exchanged.

8. The method of claim 6, wherein calculating a likelihood that each created token will be exchanged for a unit of the refined commodity in a particular future time window additionally comprises determining whether the created token is still present in an account on a wallet server to which the created token was created.

9. The method of claim 6, wherein calculating a likelihood that each created token will be exchanged for a unit of the refined commodity in a particular future time window additionally comprises determining whether the created token has been transferred to another account that will delay exchange of the created token.

10. The method of claim 6, wherein calculating a likelihood that each created token will be exchanged for a unit of the refined commodity in a particular future time window additionally comprises determining whether the created token has been incorporated into a smart contract.

* * * * *